(12) United States Patent
Salesky et al.

(10) Patent No.: US 6,367,934 B1
(45) Date of Patent: Apr. 9, 2002

(54) MULTI-DISPLAY SYSTEMS (75) Inventors: William J. Salesky, Irvine; Joseph H. Salesky, Cameron; Donald P. Wilcox, Irvine, all of CA (US)

(73) Assignee: SKYTRON Corporation, Irvine, CA (US)

( * ) Notice: Subject to any disclaimer, the term of this patent is extended or adjusted under 35 U.S.C. 154(b) by 0 days.

(21) Appl. No.: 09/136,895

(22) Filed: Aug. 19, 1998

Related U.S. Application Data (60) Provisional application No. 60/056,825, filed on Aug. 22, 1997.

(51) Int. Cl.7 .............................................. G03B 21/00
(52) U.S. Cl. ........................................... 353/74; 353/94
(58) Field of Search .............................. 353/74, 76, 79, 353/94; 359/449; 348/36; 352/69

(56) References Cited

U.S. PATENT DOCUMENTS

| | | | |
|---|---|---|---|
| 3,586,432 A | 6/1971 | Pentes, Jr. ................... 353/74 |
| 4,129,365 A | * 12/1978 | Aversano et al. ............. 353/94 |
| 4,597,633 A | 7/1986 | Fussell ........................ 350/125 |
| 4,641,918 A | 2/1987 | Moffatt et al. ............... 350/125 |
| 4,991,955 A | * 2/1991 | Vetter ........................... 352/69 |
| 5,116,117 A | 5/1992 | Miyashita ..................... 353/94 |
| 5,179,399 A | * 1/1993 | Pringle ......................... 353/94 |
| 5,264,881 A | 11/1993 | Brooke ......................... 353/94 |
| 5,376,980 A | * 12/1994 | Gersuk et al. ................ 353/94 |
| 5,382,990 A | 1/1995 | Hata et al. .................... 353/94 |
| 5,457,508 A | 10/1995 | Ichihara et al. ............... 353/10 |
| 5,539,483 A | 7/1996 | Nalwa .......................... 353/94 |
| 6,056,406 A | * 5/2000 | Park ............................. 353/94 |

* cited by examiner

*Primary Examiner*—William Dowling (57) ABSTRACT

This patent document discloses an interactive, disassemblable, portable multi-display system for displaying images. The multi-display system includes a multi-sided structure that is associated with at least two image projectors. The structure forms an enclosure wherein at least two of the sides have light transmissive portions. The image projectors may advantageously be disposed within the enclosure for projecting their respective image beams on the light transmissive portions of the side. At least two of the image beams produce viewable images on the light transmissive portions and, according to one embodiment, at least a portion of each of these image beams intersect without interference.

20 Claims, 10 Drawing Sheets

MULTI-DISPLAY SYSTEMS

CROSS-REFERENCE TO RELATED APPLICATIONS

The present invention is related to that disclosed in U.S. Provisional Patent Application No. 60/056,825, filed on Aug. 22, 1997, entitled "MULTI-SIDED INTERACTIVE DISPLAY SYSTEM" which is commonly assigned to the assignee of the present invention. The disclosure of this related provisional patent application is incorporated herein by reference for all purposes as if fully set forth herein.

TECHNICAL FIELD OF THE INVENTION

The present invention is directed, in general, to display systems and, more specifically, to interactive, disassemblable, portable multi-display systems.

BACKGROUND OF THE INVENTION

Conventional large-screen display systems are used in a multitude of public venues, including exhibition halls, department stores, convention centers, trade-shows and sports arenas. At one end of the size scale, these display systems may be large cathode ray tube devices, such as 40 or more-inch screen televisions. At another end of the size scale, these displays may be either rear projection screens or large video displays consisting of many pixel elements arranged in a large, flat-panel array.

Two of the better known large-screen video display systems are the Sony JUMBOTRON® screen and the Mitsubishi DIAMOND VISION® screen. These display systems may include displays of various sizes. For example, some of the standard screen sizes and weights for the JTS-17 JUMBOTRON® units are 8'×11'—3,000 lbs., 12'×16'—7,000 lbs., and 16'×22'—12,500 lbs. Some of the standard screen sizes and weights for the JTS-35 JUMBOTRON® units are 12'×16'—7,000 lbs., 16'×22'—12,500 lbs., 20'×27'—19,000 lbs., and 24'×33'—28,000 lbs. The depth of these screens is about 15 inches. The images displayed on these devices are viewable through about a 120-degree range.

Despite their increasing prevalence, large display systems frequently suffer a number of drawbacks. The flat screen video systems, such as the JUMBOTRON® and DIAMOND VISION® screens are heavy, bulky, prohibitively expensive, require specialized installation, require cooling, and may have a somewhat limited viewing range. They also are not easily disassembled, or portable, or are at least very expensive and difficult to transport.

Large-screen televisions also have a number of drawbacks. Like the flat screen video displays, current large-screen tube televisions are heavy and bulky. There is also a practical limit to the size of a large-screen television due to manufacturing limitations associated with the cathode ray tube in a large-screen television. Large-screen televisions are expensive and are not readily transportable, since the largest element in a large-screen television, the cathode ray tube, cannot be disassembled.

Large screen televisions are currently also manufactured using rear screen projection technology. In projection televisions a projector is located at the front bottom portion of the unit and a mirror is paced at the rear portion of the unit to reflect the image onto a rigid fresnel screen. Similar to large screen tube TVS the current state of the art in these projection devices are really non-portable, heavy, and have screen sizes up to approximately 200" diagonal (also known as "retro boxes").

The problems associated with large-screen televisions and large, flat-screen video displays are exacerbated when the devices are used in a multi-sided display system (also called a "multi-display system"), such as one having three or more sides, with a viewable display on each side. The cost, weight and portability problems of a single flat-screen video display or cathode ray tube device are multiplied accordingly in a multi-sided display system.

There is therefore a need in the art for improved multi-sided display systems that do not suffer from the cost, weight and portability problems inherent in the prior art. In particular, there is a need for an improved large-screened multi-display system that is light-weight relative to the current art, and easily transportable, that uses a minimal amount of construction materials, and that may be rapidly installed in either a permanent or temporary location. In particular, there is a need in the convention/venue art for a temporary, quickly assembled, installed, removed and disassembled interactive multi-display system that is capable of operating independently as well as under the control of an operator.

SUMMARY OF THE INVENTION

To address the above-discussed deficiencies of the prior art, the present invention provides an interactive, disassemblable, portable multi-display system for displaying images. An exemplary multi-display system, that may be associated with an audio system, includes a multi-sided structure capable of forming a plurality of viewable images, that may, for instance, include two or more image projectors, or, in alternate embodiments, a plurality of flat panel displays, or the like (collectively, along with the image projectors, "image generating means").

According to one advantageous embodiment incorporating the image projectors, the structure forms an enclosure wherein at least two of the sides have light transmissive portions. The image projectors may advantageously be disposed within the enclosure for projecting their respective image beams on the light transmissive portions of the sides. Two or more of the image beams produce viewable images on the light transmissive portions. In a related embodiment, at least a portion of each of these image beams intersect without causing interference to one another.

An important aspect of this multi-display system is that it is relatively inexpensive, light-weight, portable and disassemblable as compared to the above-described systems of the prior art. This is particularly important in the convention/venue art where a temporary, quickly assembled, installed, removed and disassembled multi-display system is needed. For instance, the multi-display system may be comprised of lightweight, flexible materials—for instance, the sides (or surfaces thereof) may be comprised of masonite, paperboard, foam core board, styrene, expanded PVC foam, vinyl, cotton, or other suitable cloth or other suitable material, or combination thereof.

In one advantageous embodiment, the multi-sided structure is defined by a substantially inflexible frame that mechanically, or, more broadly, physically, cooperates with the plurality of sides to form the enclosure. For the purposes here of, the term "structure," and its derivatives, are defined broadly as the sum total of the structural features of the multi-display system, or relevant portion thereof—in other words, the arrangement or interrelation of the various parts comprising the multi-display system, or the relevant portion; the term "or" is defined as inclusive, meaning and/or; the term "frame," and its derivatives, may be defined as any load carrying skeleton of the structure or relevant portion thereof, and, more broadly, the frame may be actual (e.g., associable pipe, tube, rod, shaft, strut, girder, beam, crossbar, crosspiece, cable, etc.) or implicit (i.e., physical cooperation of ones of the plurality of sides to form, or control a form, of the structure), for instance, assume: (i) four separate "sides," each having the same equilateral triangle shape, (ii) at least one of the sides is made of a suitably firm material, (iii) the sides may be suitably associated with one another along ones of their edges to form a three-sided pyramid, and (iv) the pyramid may be suspended from a ceiling, the association of the four sides along their edges and the material, or physical, composition of the one side cooperate to form an implicit frame, or, alternative, cooperate to eliminate a need for an actual frame. The phrase "associated with," and derivatives thereof, as used herein, may mean one or more of the following: include, interconnect with, contain, be contained within, connect to or with, couple to or with, be communicable with, juxtapose, cooperate with, combine with, be disposed proximate or relative to, interleave, be integral with, intercept, be a property of, be bound to or with, have, have a property of, or the like.

In one embodiment, the structure is substantially shaped like a polygon and one or more of the image generating means are disposed proximate one or more vertices of the polygon. In a related embodiment, image generating means are actually disposed within the enclosure, substantially, if not completely, hiding the same from anyone viewing the viewable image. In another embodiment, one side (e.g., a sidewall, top-side, bottom-side, etc.) is associated with a first image generating means, such as one of the image projectors, which is, in turn, substantially opposite another side.

In a further embodiment, the multi-display system includes means for associating it with one or more of a ceiling, a deck or another multi-display system. Such "associating means" includes any known, or later developed, device, apparatus, equipment, implement, instrument, mechanism, or other like object or workings that is capable of mating, coupling or otherwise associating the multi-display system with the ceiling (e.g., cabling, framework, brace, clasp, clip, anchor, catch, etc.), the deck (e.g., legs, clasp, clip, grip, vise, attachment, anchor, hook, catch, glue, tack, screw, bolt, rivet, staple, etc.), or the other multi-display system (e.g., legs, clasp, clip, grip, vise, attachment, anchor, hook, catch, glue, tack, screw, bolt, rivet, staple, etc.). In a related embodiment, the multi-display system is adapted for suspension above or within an exhibit, trade show booth, or other event from a ceiling, or for mounting directly on the ceiling.

For the purposes hereof, the term "ceiling" is defined broadly as any overhead surface of a room, hall, a booth or like area, including support structures, columns, or other related structures, including any suitable structure at an outdoor/environmental venue, such as a tent, crane, etc.; and the term "deck," as used herein, is defined broadly as any bottom surface, whether a floor inside a building, the ground outside, a top-surface of a platform, or the like. It should also be noted that the term "include," and derivatives thereof, means inclusion without limitation.

In an embodiment wherein a plurality of multi-display systems are stacked one on top of another, a motor or other conventional rotational means (e.g., motor, etc.) may be associated with such stackable multi-display systems and operate to rotate at least one such multi-display system with respect to another, or with respect to the deck or ceiling.

In some embodiments an audio sound system may be included in to the display system integrated with the images being formed, such as, on each of the independent transmissive screens. In related embodiments the "on board" sound systems may have the sound "down-cast" or broadcast toward the booth, event or other common area. In other embodiments the light transmissive screen may not be perpendicular to the top and bottom portions of the display. One such example would be the light transmissive screens being approximately 85° from the top surface to reduce glare from ambient light emanating from ceiling light fixtures at a trade show or convention—in other words, an image may be viewed by viewers beneath the system. In yet further embodiments, cameras, lighting fixtures or other audio or visual devices may be attached to the bottom, side or other section of the display system to provide a lighting source or spot lighting, or another video source for display, to a trade show booth or other venue exhibit.

In some embodiments transmission of audio or video data to the multi-display system will be transmitted via wireless methods such as microwave or FM frequency transmission of audio and video signals. In these instances only a single power cable may be required to power the multi-display system. In a suspension from a ceiling or installation on a ceiling the cable will typically be dropped from the ceiling along the suspension cables. In a related embodiment, the system includes a controller, such as a computer, video disk, or other processing system, that is capable of controlling the operation, particularly the image or possibly, audio content, of the display system. This control may, at least in part, be distributed or interactive to enable an operator to direct the operation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiments disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 10, discussed below, and the various embodiments used to describe the principles of the present invention in this patent document are by way of illustration only and do not limit the scope of the invention. Those skilled in the art will understand that the principles of the present invention may be implemented in many different suitably arranged multi-display systems, forming a variety of structures, frames and the like.

Figure 1:
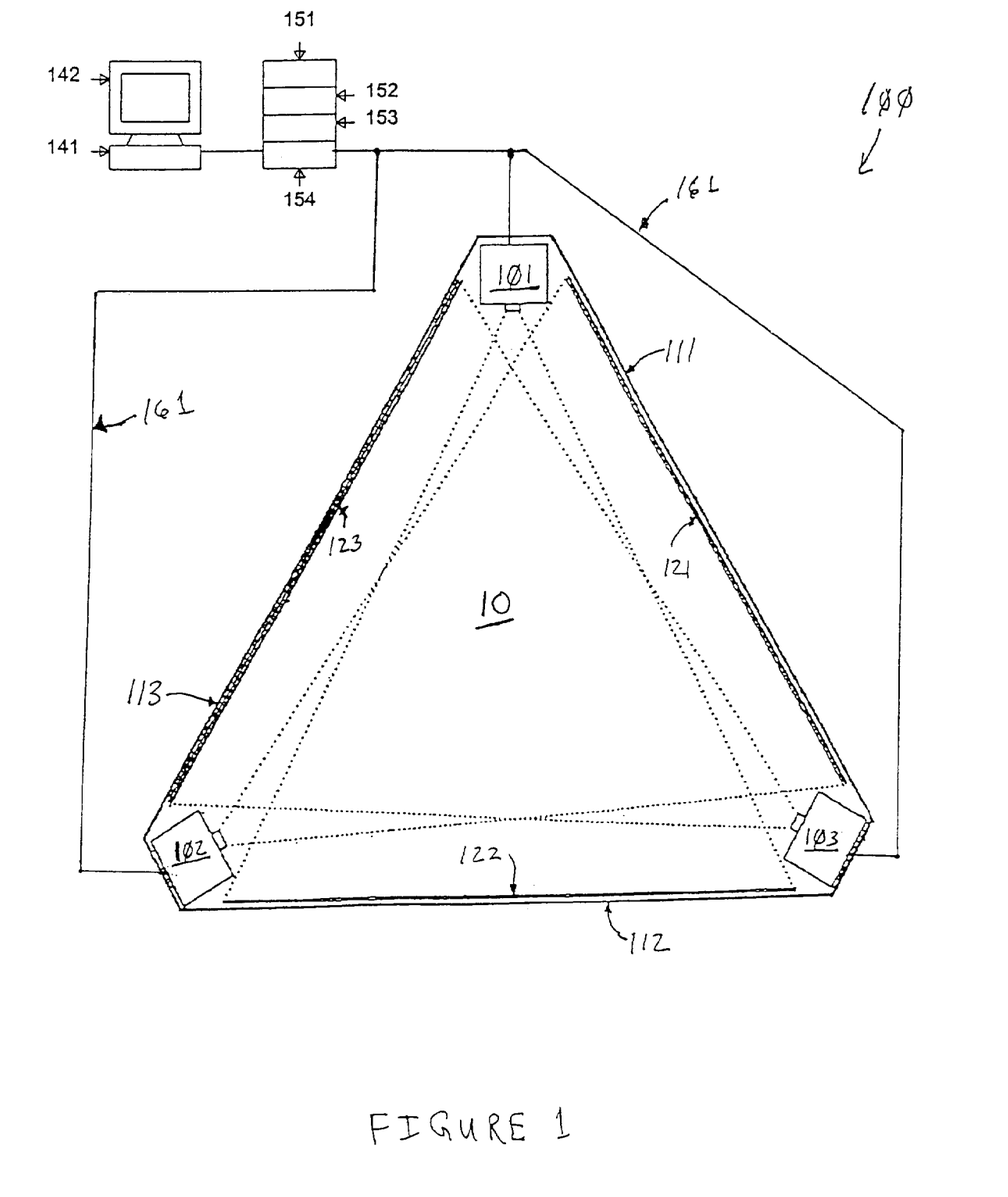
FIG. 1 illustrates a top plan view of a multi-display system in accordance with one exemplary embodiment of the present invention.

Turning initially to FIG. 1, illustrated is a top plan view of a multi-display system 100 in accordance with one exemplary embodiment of the present invention. Multi-display system 100 comprises three sides 111–113 that form a structure having an enclosure 10 that houses three image projectors 101–103. Although exemplary enclosure 10 formed by sidewalls 111–113 is most accurately described as an irregular hexagon, the overall appearance of the enclosure is generally that of an equilateral triangle, albeit with beveled corners (vertices). Note that the terms "comprise" and "include," along with their derivatives, are used interchangeably.

For the purposes of simplicity and clarity in illustrating and explaining the operation of the image projectors in the multi-display system 100, the internal framework and other assemblies that support image projectors 101–103 and sidewalls 111–113 are not shown. These structures will be introduced and explained below in greater detail in connection with other figures. Furthermore, an optional top or bottom cover is not shown in the top plan view of the multi-display system 100 in order to better illustrate and describe the interior thereof.

Exemplary multi-display system 100 illustrates a rear-projection system. Each of the image projectors 101–103 is disposed in one of three corners of the multi-display system 100 and projects an image onto one of the inner surfaces 121–123 of the sidewalls 111–113. Note that in alternate embodiments, the image projectors 101–103 may be suitably associated with the multi-display system 100 so as to be operable to project an image onto inner surface 121–123. It should also be noted that exemplary image projectors 101–103, in combination with sides 111–113, are used to illustrate but one embodiment of a multi-display system, and more particularly, image generating means, in accordance with the principles of the present invention.

It is within the scope of the present disclosure to use a plurality of suitably arranged "flat" screens in lieu of one or more of the above-described arrangements. In point of fact, such image generating means (e.g., plasma screens, liquid crystal diode screens, etc.) may be associated with an actual frame, such as that illustrated throughout this document, or an implicit frame, formed by the association of the screens. For the purposes hereof, the phrase, "image generating means" is defined broadly as any system, device, or like means, including later developed technologies, that is operable to generate an image, or like optical counterpart, of an object or a scene.

With respect to the present embodiment, the projected images, or image beams, are indicated by the dotted lines in FIG. 1. Image projector 101 projects an image onto the inner surface 122 of the sidewall 112. Image projector 102 projects an image onto the inner surface 121 of the sidewall 111. Image projector 103 projects an image beam onto the inner surface 123 of the sidewall 113. At least a portion of each of the sidewalls 111–113 is light transmissive (i.e., transparent, semi-transparent, etc.) so that at least a substantial portion of, or perhaps most of, the light from the projected image beam may readily pass through. As a result, the image beam projected on each inner surface produces a clear image on the corresponding outer surface of each of the sidewalls 111–113 that may easily be perceived by a viewer. According to the principles of the present invention, the "surface" described herein may be any known or later developed medium on, or through, which one or more image beams may be projected to produce a clear image, including, for instance, light transmissive liquid/vapor/fog "mist screens."

Each of the image projectors 101–103 may be any one of a number of well-known image projection systems. In relatively simple embodiments of the present invention, one or more of the image projectors 101–103 may be film slide projectors. The slides are pre-loaded into the image projectors 101–103 and may changed by remote control, or automatically, as by a program script or by a timer in the image projectors 101–103. In other embodiments of the present invention, one or more of the image projectors 101–103 may be film projectors. Again, the video/image media may be operated by remote control, or automatically, as by repeat play by videocassette recorders, video disk players, computer or other like processing means associated with the image projectors 101–103. Alternatively, each projector may have flash card or memory card capabilities onto which audio/video programming has been pre-recorded. In this case, no transmission system is required.

In a advantageous embodiment of the present invention, one or more of the image projectors 101–103 may be audio-video projectors, including video slide projectors. The images displayed by the image projectors 101–103 may be generated and controlled by a remote or "on-board" controller, such as a personal computer (PC) 141, a monitor 142, and audio-video sources 151–154 (collectively, a "controller;" which, for the purposes hereof, may suitably be any known, or later developed, hardware-, firmware-, software-based system, or combination thereof, capable of performing the functions disclosed herein). The audio-video sources 151–154 may be any one of a number of different types of well-known audio-video devices, including live camera feed, video-cassette recorder (VCR) tape players, digital video disc (DVD) players, video CD or CD-ROM players, MPEG files stored in computer memory, magnetic or optical disk, data received over a network, or the like.

In the illustrated embodiment, the audio-video outputs of one or more of the audio-video sources 151–154 are transmitted to the image projectors 101–103 by means of a wire, or suitable communication, link 161. In alternate embodiments of the present invention, the outputs of audio-video sources 151–154 may be wirelessly transmitted to one or more transceivers at or near the image projectors 101–103. Each of the image projectors 101–103 may receive a different audio-video signal from audio-video sources 151–154 or two or more may receive the same audio-video signal from audio-video sources 151–154. An operator may manually input commands orally (e.g., speech recognition software), or via keyboard, infrared remote, or mouse, to PC 141 in order to control the images displayed by the image projectors 101–103, or PC 141 may execute a stored program that controls the images projected by the image projectors 101–103. In other embodiments, the PC 141, the monitor 142, and the audio-video sources 151–154 may be built into the multi-display system 100. In such an implementation, the PC 141 may actually be a laptop computer or be only a control circuit card that is wirelessly controlled by a remote control device used by an operator. This is a particularly advantageous embodiment for ceiling-mounted or floor-elevated versions of the multi-display system 100, since only a power cord needs to be externally connected to the multi-display system 100. Of course, remote updating, diagnostics, "troubleshooting" and the like may be accomplished via any suitable wireless or wireline connection.

The relative positioning of the image projectors 101–103 allows the projected image beams, indicated by dotted lines, to intersect without interfering with one another. In order to produce an image of a certain height, H, and width, W, a certain minimum focal length must separate the image projector and the opposing sidewall on which the image beam is projected. This projection distance of the image beam permits it to "spread" to full size by the magnification effects of the image projector's optics. However, the space separating the image projector and the opposing sidewall can be "reused" by other image projectors that project intersecting image beams through the same separation space. This advantageously allows the overall volume of the multi-display system 100 to be minimized with respect to the size of the image displayed on each side. An anamorphic lens may be used with certain image generating means, such as projectors 101–103, to effectively shorten focal length and optically "stretch," or widen, the image.

By way of comparison, if three conventional television screens were used in a three-sided multi-display system, the volumes of space occupied by the sealed cathode ray tubes in the television screens could not, of course, intersect or overlap in the same manner as the image beams projected by the image projectors 101–103. Therefore, a multi-display system incorporating three conventional television screens would be much larger than the multi-display system 100 in order to display images of the same size.

Another important advantage of the present invention is that it operates effectively in full ambient indoor light. Current mass produced large screen projection televisions generally do not generate images that are intense enough to be viewable in ambient light from more than 50 ft away.

Figure 2:
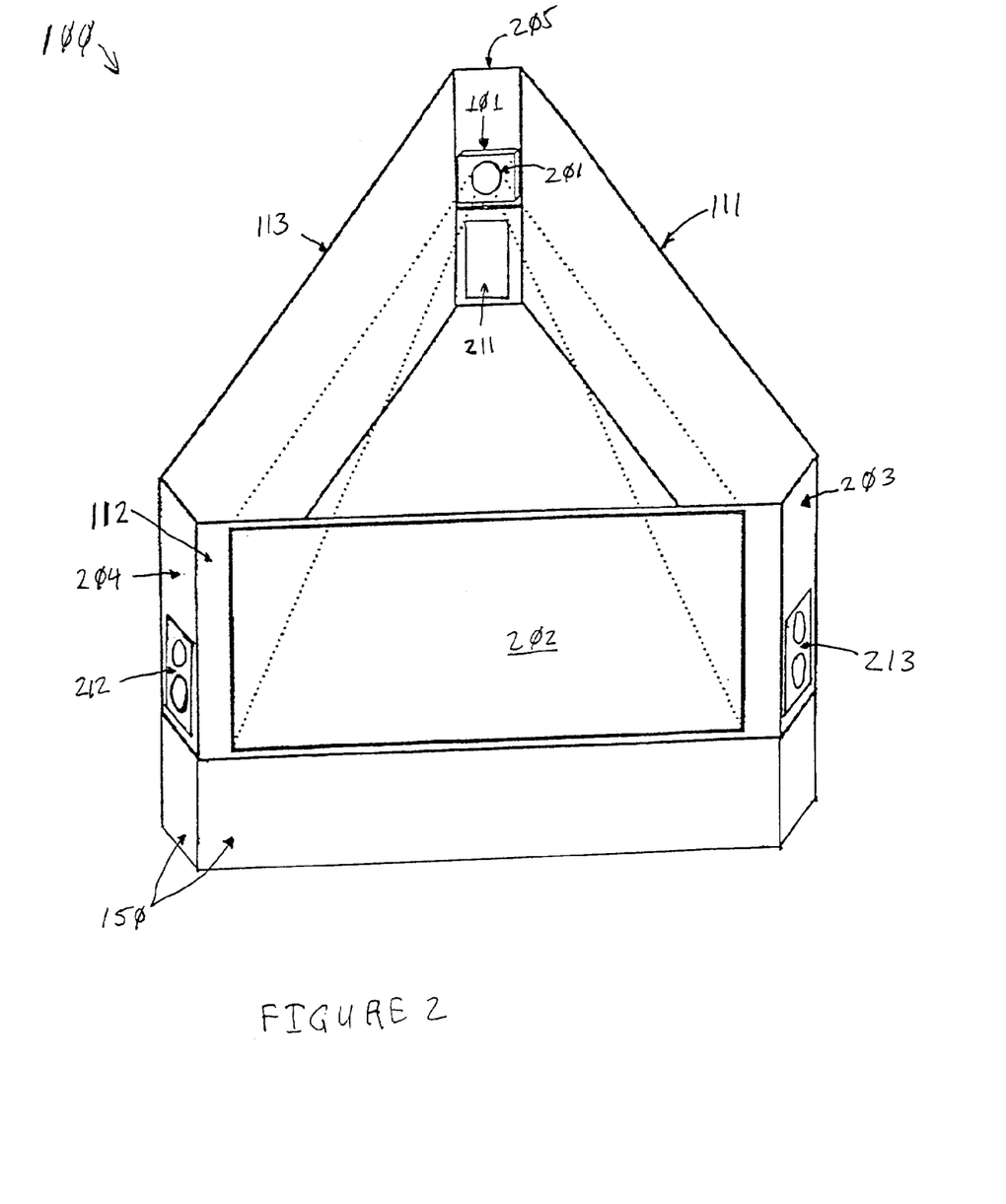
FIG. 2 is a perspective view of the exemplary multi-display system of FIG. 1.

Turning next to FIG. 2, illustrated is a perspective view of the exemplary multi-display system 100 in FIG. 1. Image projector 101 projects a light image through lens 201 onto the inner surface of sidewall 112, producing a viewable image 202 or the outside of the sidewall 112. For the purpose of simplicity, image projectors 102 and 103 are omitted from FIG. 2; it should be understood, however, that the image projectors 102 and 103 operate in similar manners to the image projector 101.

Exemplary multi-display system 100 also comprises three or more audio speakers 211–213 for playing one or more soundtracks, associated with one or more of the images displayed on the outer surfaces of the sidewalls of the multi-display system 100. For example, speaker 211, located in sidewall 205, speaker 212, located in sidewall 204, and speaker 213, located in sidewall 203, may play a soundtrack associated with the audio-video image 202 displayed on the sidewall 112. Speakers 211–213 may also play different soundtracks associated with different images displayed on the sidewalls 111–113 of the multi-display system 100. In other embodiments of the present invention, speakers 211–213 may be omitted entirely for those video images which do not require a soundtrack, or located in an alternate location. For instance, speakers 211–213 may be located externally to the multi-display system 100, such as in a trade-show booth below or near the display system or anywhere in a corners of the room in which the multi-display system 100 is situated and sound is desired.

In the illustrated embodiment, image projector 101 is located approximately at the mid-height level of the sidewall 205 and is aligned with the vertical and horizontal centers of the video image 202, thereby producing an approximately rectangular video image 202 on the sidewall 112. In other embodiments, one or more of the image projectors 101–103 may be positioned elsewhere on the sidewalls 203–205, such as proximate the bottom edge or the upper edge of the sidewalls 203–205 of the multi-display system 100. When image projector 101 is disposed in an off-center position, such as near the bottom edge or the top edge of sidewall 205, the shape of the projected image 202 on the opposing sidewall 112 may be distorted into a trapezoidal shape, an effect commonly referred to as "keystoning".

The multi-display system 100 may be placed directly on the floor or mounted on a base platform 150 placed on the floor. Such a base platform may be a part of an exhibit, trade-show booth, or other display structure such that the display system is elevated above the audience for larger audience viewing. Alternatively, the multi-display system 100 may be attached directly to a ceiling or suspended by cables from the ceiling. Although the sides of the multi-display system 100 are shown in FIGS. 1 and 2 as approximately vertical, this need not be the case. In some embodiments of the present invention, the sidewalls 111–113 and 203–205 may be tilted outward near the top, so that the surfaces of the sidewalls are faced slightly downward. In ceiling-mounted or suspended embodiments, this facilitates viewing the sidewalls from positions that are almost underneath the multi-display system 100.

Figure 3:
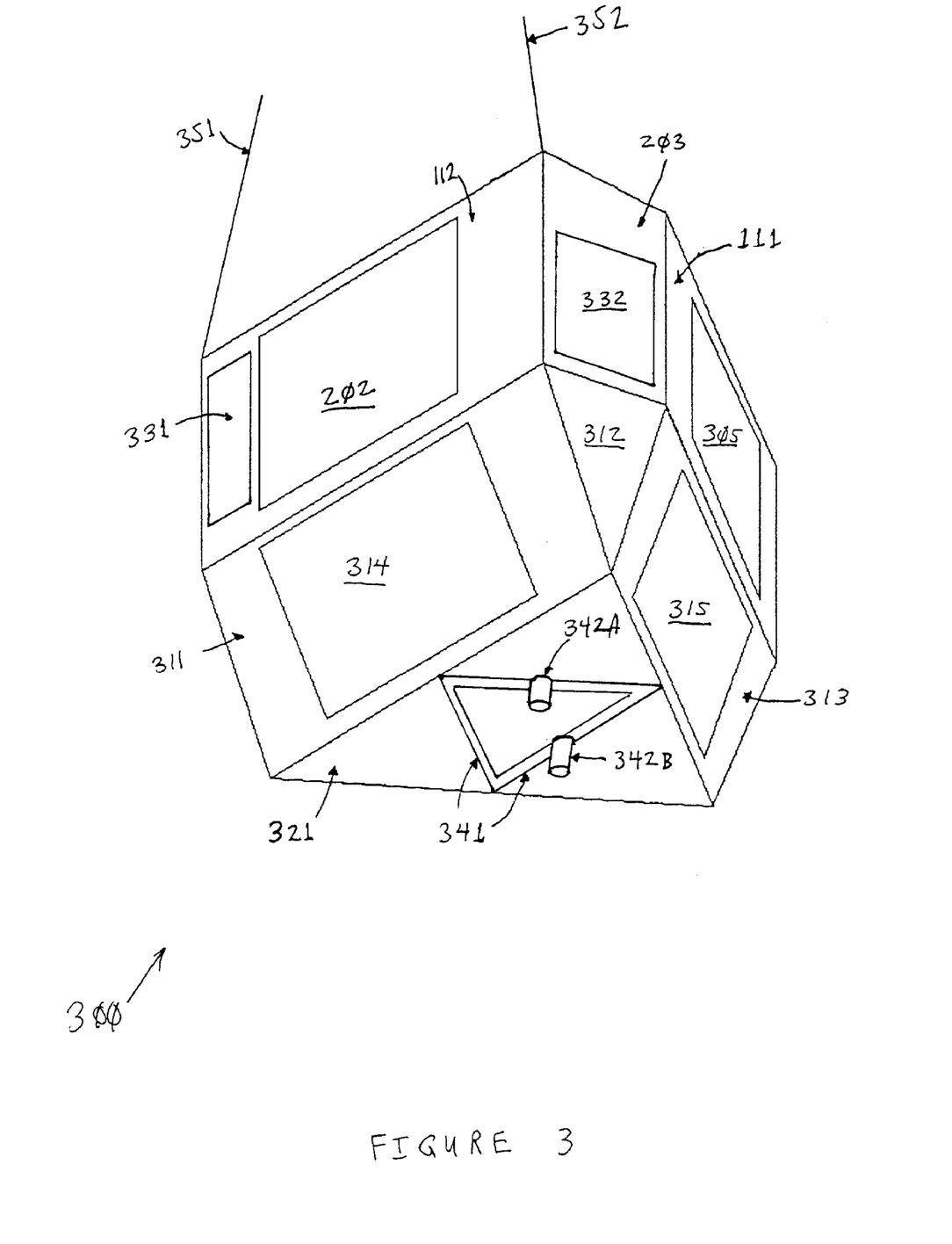
FIG. 3 illustrates a perspective view of a multi-display system in accordance with one advantageous embodiment of the present invention.

Turning next to FIG. 3, illustrated is a perspective view of exemplary multi-display system 300 in accordance with another embodiment of the present invention. The multi-display system 300 comprises a triangular upper portion similar to the multi-display system 100, comprising sidewalls 112, 203 and 111. However, multi-display system 300 also comprises a triangular lower portion attached to the upper portion comprising sidewalls 311, 312, 313 and other sidewalls that are not visible in the perspective view shown. Image projectors within the multi-display system 300 project images on image screens 202, 305, 314 and 315 on the inner surfaces (not shown) of the sidewalls 112, 111, 311 and 313, respectively. In the illustrated embodiment, the multi-display system 300 is suspended from an overhead structure (not shown), such as a ceiling, by the cables 351 and 352.

Sidewalls 311 and 313 on the lower portion of the multi-display system 300 are tilted downward in order to facilitate viewing images 314 and 315 by persons standing almost beneath the multi-display system 300. The outer surfaces of the multi-display system 300 also may comprise advertising graphics 331 and 332 or sidewalls 112 and 111, respectively. Advertising graphics 331 and 332 may be applied by any conventional means, including by spray painting, by printing, adhesive backed graphics, by hook and mesh fasteners, or materials applied by permanent or temporary adhesives. In one embodiment of the present invention, the advertising graphics 331 and 332 comprise clear plastic sheaths or sleeves attached to sidewalls 112 and 111 into which printed advertisements may be removably inserted.

In one embodiment of the present invention, both of the images 202 and 314 may be produced by a single image projector disposed in an opposing corner of the multi-display system 300 by splitting its single image beam into two separate image beams by conventional prism and mirror arrangements. Alternatively, images 202 and 314 may be two different video images produced by two different image projectors disposed within the multi-display system 300.

In a advantageous embodiment of the present invention, the top surface and the bottom surface of multi-display system 300 are covered in order to prevent external light from entering the interior of the multi-display system 300. Sealing the top and bottom surfaces or portion thereof increases the quality of the images 202, 305, 314 and 315 produced on the sidewalls of the multi-display system 300. In alternate embodiments of the present invention, the top and bottom surfaces, or portion thereof, of the multi-display system 300 may be left open or may be covered by a transparent or substantially translucent material to form a viewable image surface.

In the illustrated embodiment of the multi-display system 300, the bottom surface of the multi-display system 300 is covered by bottom wall 321, which may be an opaque material, a transparent material, or a reflective material, such as a mirror. A substantially triangular utility track support 341 is disposed on bottom wall 321 in order to support lights 342a and 342b thereon, and may be located on the outer perimeter of the bottom surface. In other embodiments of the present invention, utility track 341 may support other appliances, such as speakers, fans, video cameras, antennas and the like. In still other embodiments of the present invention, at least a portion of the bottom wall 321 is light transmissive, so that one of the image projectors within the multi-display system 300 may be pointed downward to project an image beam onto an inner surface of the bottom wall 321. The image beam projected on the inner surface produces a clear image on the corresponding outer surface of the bottom wall 321 that may easily be perceived by a viewer positioned beneath the multi-display system 300.

Figure 4:
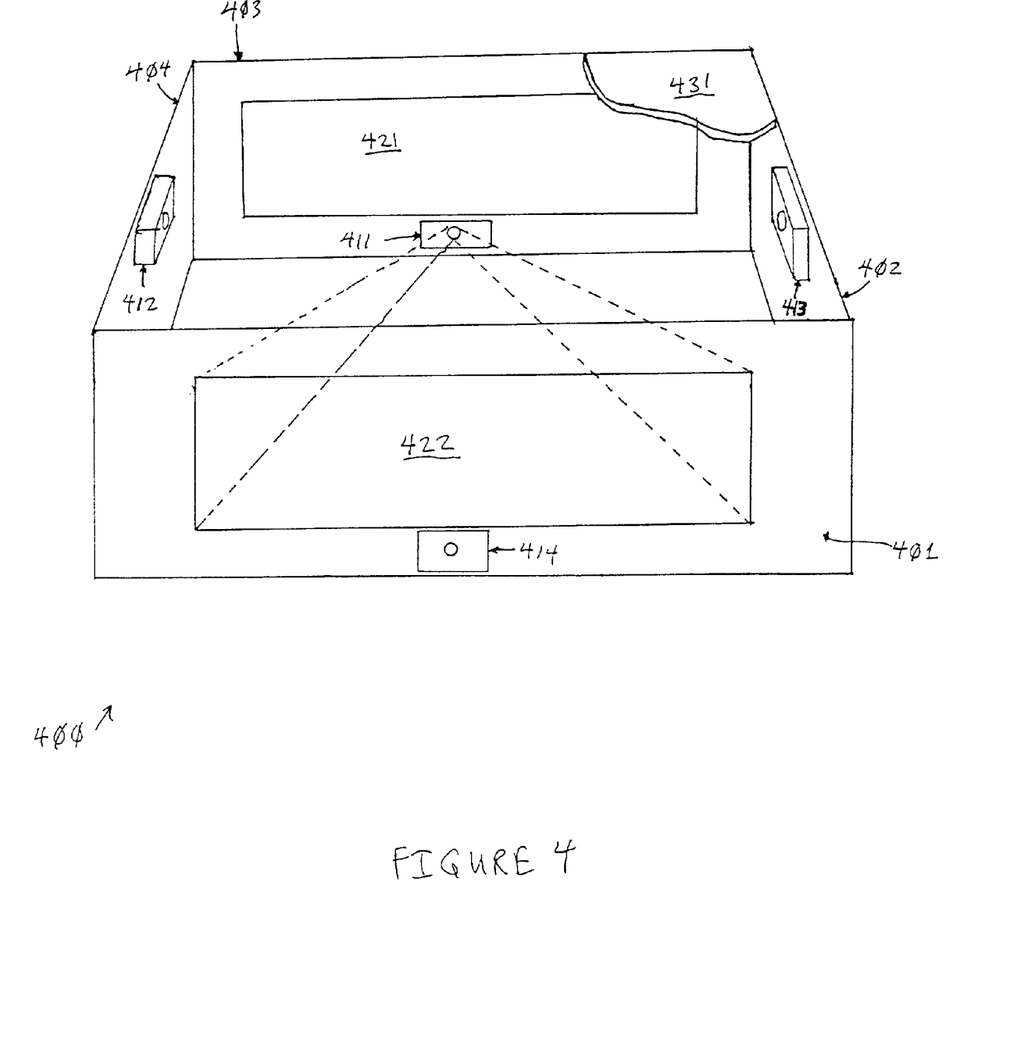
FIG. 4 illustrates a perspective view of a multi-display system in accordance with another advantageous embodiment of the present invention.

Turning next to FIG. 4, illustrated is a perspective view of an exemplary multi-display system 400 in accordance with alternate embodiment of the present invention. The upper surface of the multi-display system 400 is covered by an upper wall 431, which is shown in cut-away view in order to facilitate the viewing of the interior of the multi-display system 400.

Unlike the multi-display systems 100 and 300, the multi-display system 400 is rectangular in overall shape. In a polygon-shaped multi-display system having an odd number of sides, such as the triangular multi-display systems 100 and 300 or multi-display systems having five, seven or more sides, each image projector may be advantageously disposed proximate a sidewall or corner opposite a sidewall onto which an image may be projected. However, in a polygon-shaped multi-display system having an even number of sides, an image projector mounted in the horizontal center of the sidewall must be disposed proximate an upper edge or a lower edge of the sidewall of the multi-display system in order not to interfere with an image projected onto the same sidewall.

For example, image projectors 411 and 414 are disposed proximate the lower edges of the multi-display system 400 in order not to interfere with the images 421 and 422 displayed thereon. Image projector 411 projects image 422 onto sidewall 401. Image projector 414 projects image 421 onto sidewall 403. In certain embodiments, the optics in the lenses of image projectors 411 and 414 may be suitably modified in order to avoid keystoning effects in images 421 and 422 caused, for instance, by the off-center positions of image projectors 411 and 414.

In alternate embodiments, image projectors 411 and 414 may be disposed in corners of the multi-display system 400. However, the images 421 and 422 projected onto the centers of the opposing sidewalls 401 and 403 will experience a horizontal keystoning effect. Therefore, the optics of the image projectors 411 and 414 must be modified in order to compensate for the horizontal keystoning effects.

In other alternate embodiments, the image projectors on opposing faces of an even-sided multi-display system may be disposed proximate the upper edge of the sidewalls. For example, the image projector 412 is disposed proximate the upper edge of the sidewall 404 and the image projector 413 is disposed proximate the upper edge of the sidewall 402. Image projector 412 projects an image on sidewall 402 beneath image projector 413. Correspondingly, image projector 413 projects an image on sidewall 404 below image projector 412.

In still other embodiments of the present embodiment, image projectors on opposing sidewalls of an even-sided multi-display system may be disposed such that one image projector is disposed proximate an upper edge of a first sidewall while the opposing image projector is disposed proximate the lower edge of an opposing second sidewall.

Generally speaking, the locations of the image projectors within a multi-display system embodying the principles of the present invention will vary according to a number of factors, including the number of image displays desired (and, therefore, the number of sides required), whether there are an odd or even number of sides, the projector focal length, the image size, the amount of extra space on each side outside the image area, and the like. It is not required that image projectors be located in the corners of a multi-display unit having an odd number of sides. However, this will frequently be a very space efficient implementation of the present invention.

Figure 5:
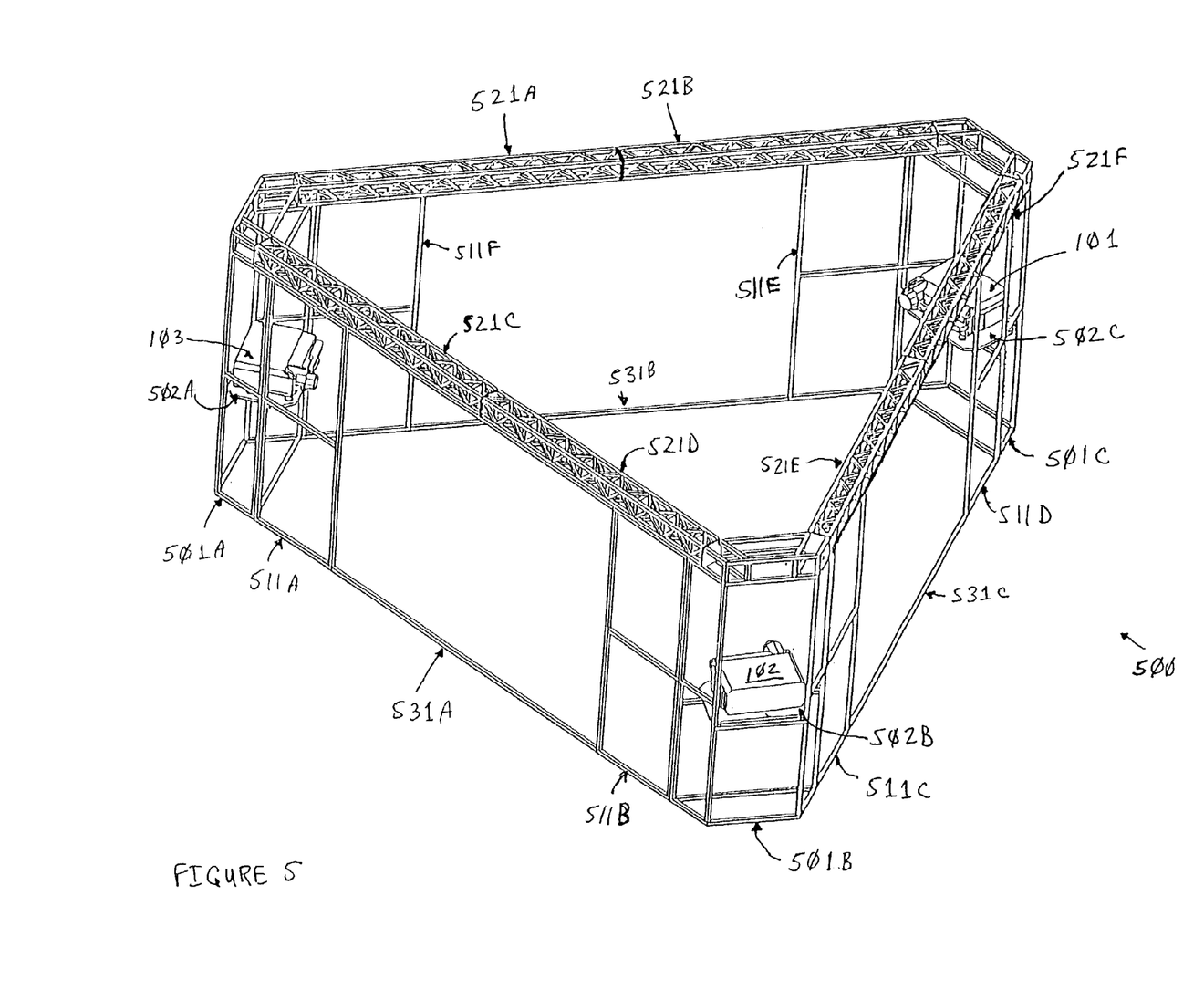
FIG. 5 illustrates a perspective view of an exemplary interior framework of a multi-display system in accordance with one embodiment of the present invention.

Turning next to FIG. 5, illustrated is a perspective view of the interior framework 500 of the multi-display system 100 in accordance with one embodiment of the present invention. The sidewalls 111, 112 and 113 have been removed from framework 500 for the purpose of simplicity in explaining the interior of framework 500.

In an advantageous form, the three sided multi-display system has two basic structural components: corner assemblies (three) and side panel assemblies (three). Following assembly of the three corner and three side assemblies, the corner assemblies are used to house the projectors and sound system components. The side panels house the transmissive screens. To exclude light, top and bottom drapes are attached to the assembled frame.

The exemplary multi-display system 100 is constructed from four basic elements, three of which are explained below in greater detail in FIGS. 6, 7 and 8. The multi-display system 100 comprises three corner support assemblies 501a–c, six side panel assemblies 511a–f, six truss assemblies 521a–f, and three crossbars 531a–c. The image projectors 101–103 are disposed on top of platforms 502a, 502b and 502c within corner support assemblies 501, 501b and 501c.

The sidewalls, including the light transmissive portions thereof, may be made from rigid (hard) or non-rigid (soft materials, or a combination of both. In some embodiments, the sidewalls 111, 112, 113 may be made of a rigid materials such as wood panels, plastic panels, metal panels, cork board, paper, foam core, glass, and the like. In other embodiments of the present invention, the sidewalls 111, 112 and 113 are made from a material, such as cloth, that is stretched over the framework 500 of the multi-display system 100. For example, the sidewalls may be comprised of vinyl that is form-fitted to the interior framework 500 and attached thereto using conventional attachment means, such as hooks, grommets, tabs, snaps, buckles, ties, and hook and mesh fasteners, such as VELCRO™.

As will be explained below in greater detail, the interior framework 500 may be easily disassembled and reassembled, thereby making the multi-display system 100 readily portable. The framework 500 may be made from a wide variety of materials, including wood, fiberglass, aluminum, titanium or other structural construction material. For instance, frame 500 could be substantially eliminated, or implicit, if sides were light, yet load bearing, such as, graphite/carbon epoxy. In one advantageous embodiment, 6061-T6 grade aluminum structural tubing is employed to minimize weight. In another embodiment of the present invention, the interior framework 500 is made of a lightweight, high-strength material, such as a polymer-fiber composite, such as graphite-epoxy composite.

Use of these lightweight materials and an external sidewall cover made, for example, from 0.060 inch thick styrene results in the multi-display system 100 being exceedingly lightweight. In these light weight embodiments, the multi-display system 100 may be fabricated such that no single component weighs more than fifty (50) pounds. This is particularly advantageous for shipping portable versions of the multi-display system 100.

Figure 6:
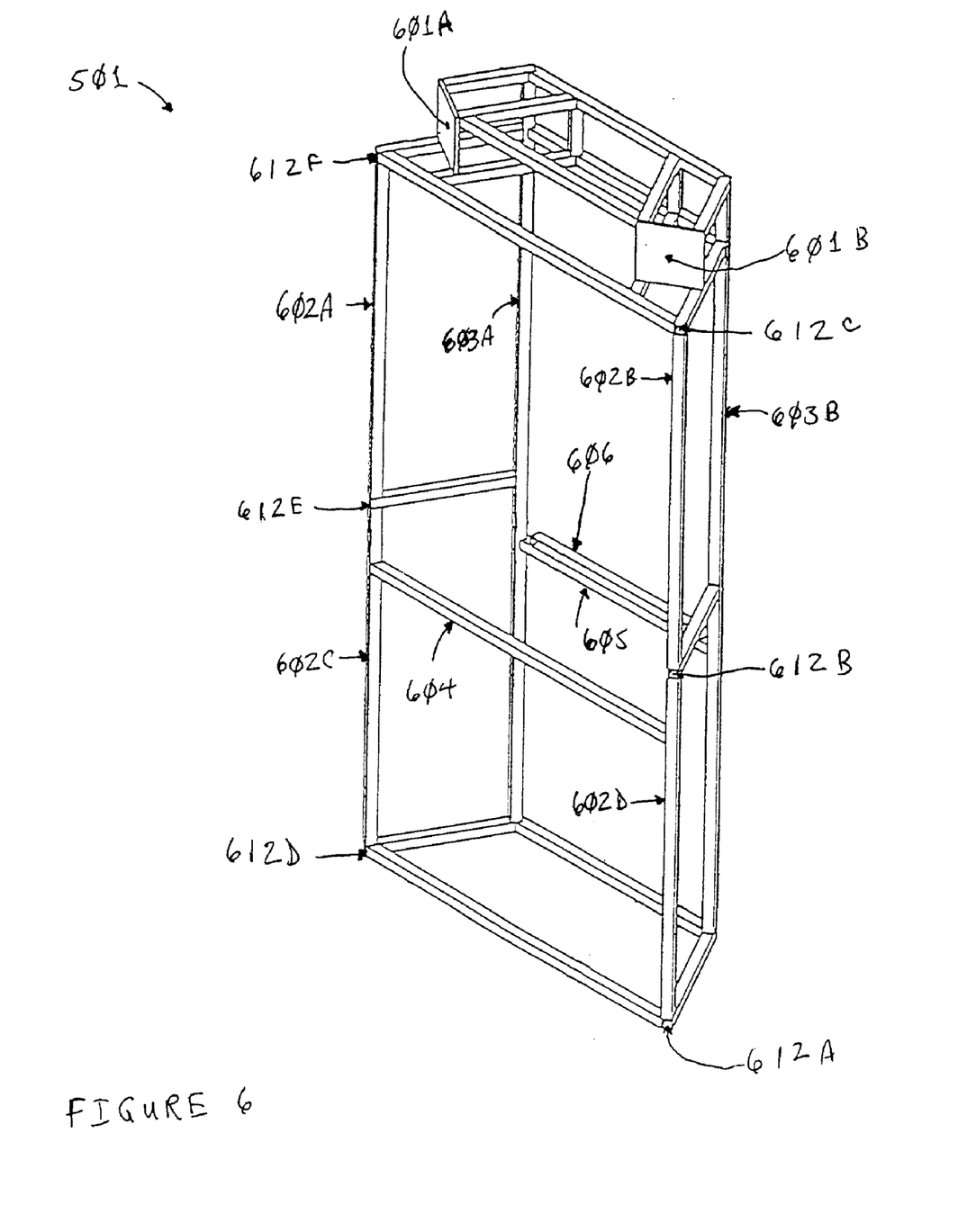
FIG. 6 illustrates a perspective view of a corner support assembly from the exemplary interior framework of a multi-display system of FIG. 5 in accordance with one embodiment of the present invention.

FIG. 6 is a perspective view of a corner support assembly 501 from the interior framework 500 of the multi-display system 100 in accordance with one embodiment of the present invention. The corner support assembly 501 comprises vertical members 602a–d, corner members 603a and 603b, and horizontal members 604 and 605. Platforms 502a–c are supported by horizontal members 604 and 605. Slotted member 606 is mounted on top of horizontal member 605, such that platforms 502a–c slide into slotted member 606 and thereby snap rigidly into place.

Apertures 612a–f are located on the inside faces of the corner support assembly 501 formed by vertical members 602a–d. Corner support assembly 501 may be snapped together with a side panel assembly 511 by using pins that insert into apertures 612a–f and corresponding apertures on the side panel assembly 511. Alternatively lift-off attachment devices, such as lift-off hinge assemblies, may be used on panel 801 to attach to corners 601. These removable hinge assemblies may also be used to attach segments 531 and 511.

Truss mounting face plates 601a and 601b are mounted on top of corner support assembly 501 in order to connect the corner support assembly 501 to corresponding ones of the truss assemblies 521a–f.

Figure 7:
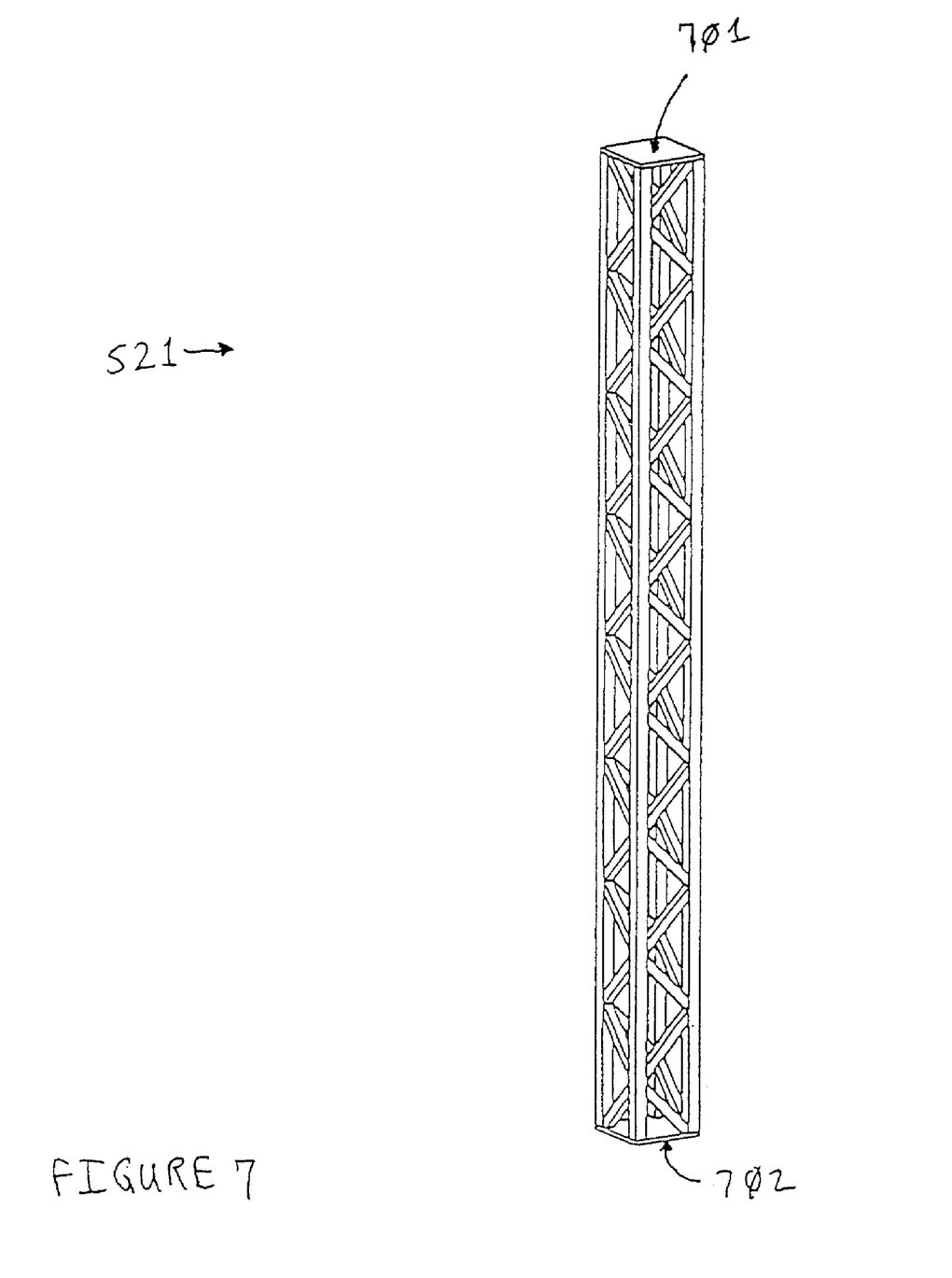
FIG. 7 is a perspective view of an exemplary truss assembly from the interior framework of a multi-display system in accordance with one embodiment of the present invention.

FIG. 7 is a perspective view of a truss assembly 521 from the interior framework 500 of the multi-display system 100 in accordance with one embodiment of the present invention. Truss assembly 521 is a relatively simple truss structure having face plates 701 and 702 on opposing ends. The top edge of each side of the interior framework 500 of the multi-display system 100 is comprised of two truss assemblies 521.

For example, a first truss assembly 521a is connected end-to-end with a second truss assembly 521b by connecting face plate 701 or face plate 702 on the truss assembly 521a to a corresponding face plate 701 or face plate 702 on the truss assembly 521. The face plates from the truss assemblies may be removably coupled together by any conventional means, including by drilling bolt holes through the face plates and bolting the units together or by other removable attachment means. For non removable assembly, attachment may be made by metal welding or by using a high strength adhesive, such as epoxy, to join the face plates together. In other embodiments of the present invention, two corresponding truss assemblies 521a and 521b may be joined together using a hinge mechanism located on the edges of corresponding face plates, such that truss assemblies 521a and 521b may be folded together for disassembly and shipping.

Figure 8:
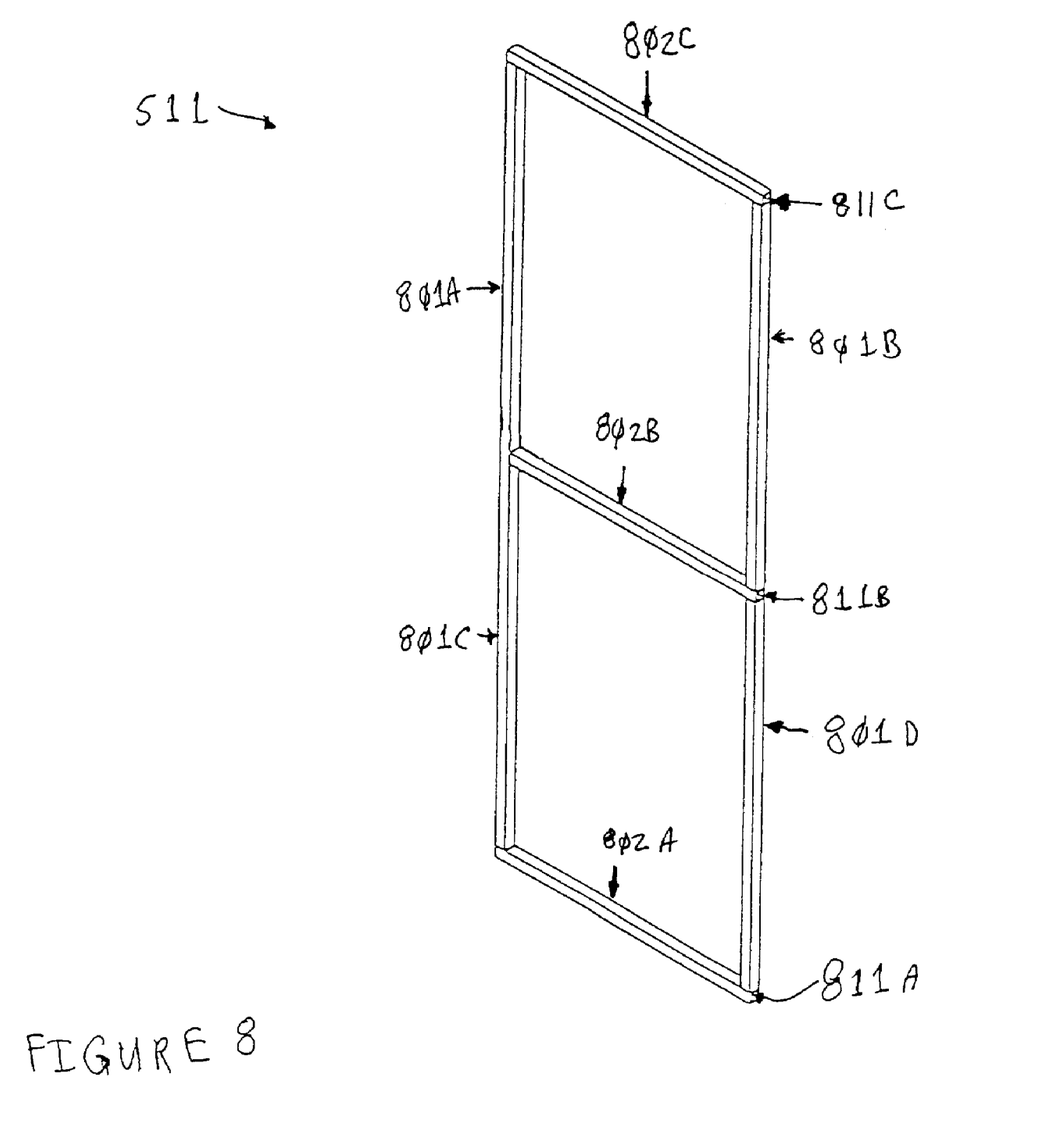
FIG. 8 is an exemplary side panel assembly from the interior framework of a multi-display system in accordance with one embodiment of the present invention.

FIG. 8 is a side panel assembly 511 from the interior framework 500 of the multi-display system 100 in accordance with one embodiment of the present invention. The side panel assembly 511 comprises vertical members 801a–d and horizontal members 802a–c. Apertures 811a–c are located on the edges of the side panel assembly 511. As noted above, the side panel assembly 511 may be snapped together with a corner support assembly 501 using pins that insert into apertures 811a–c and corresponding apertures 612a–f on the corner support assembly 501. Alternatively lift off attachment devices such as lift off hinge assemblies may be used on panel 801 to attach to corners 601. These removable hinge assemblies may also be used to attach segments 531 and 511.

Figure 9:
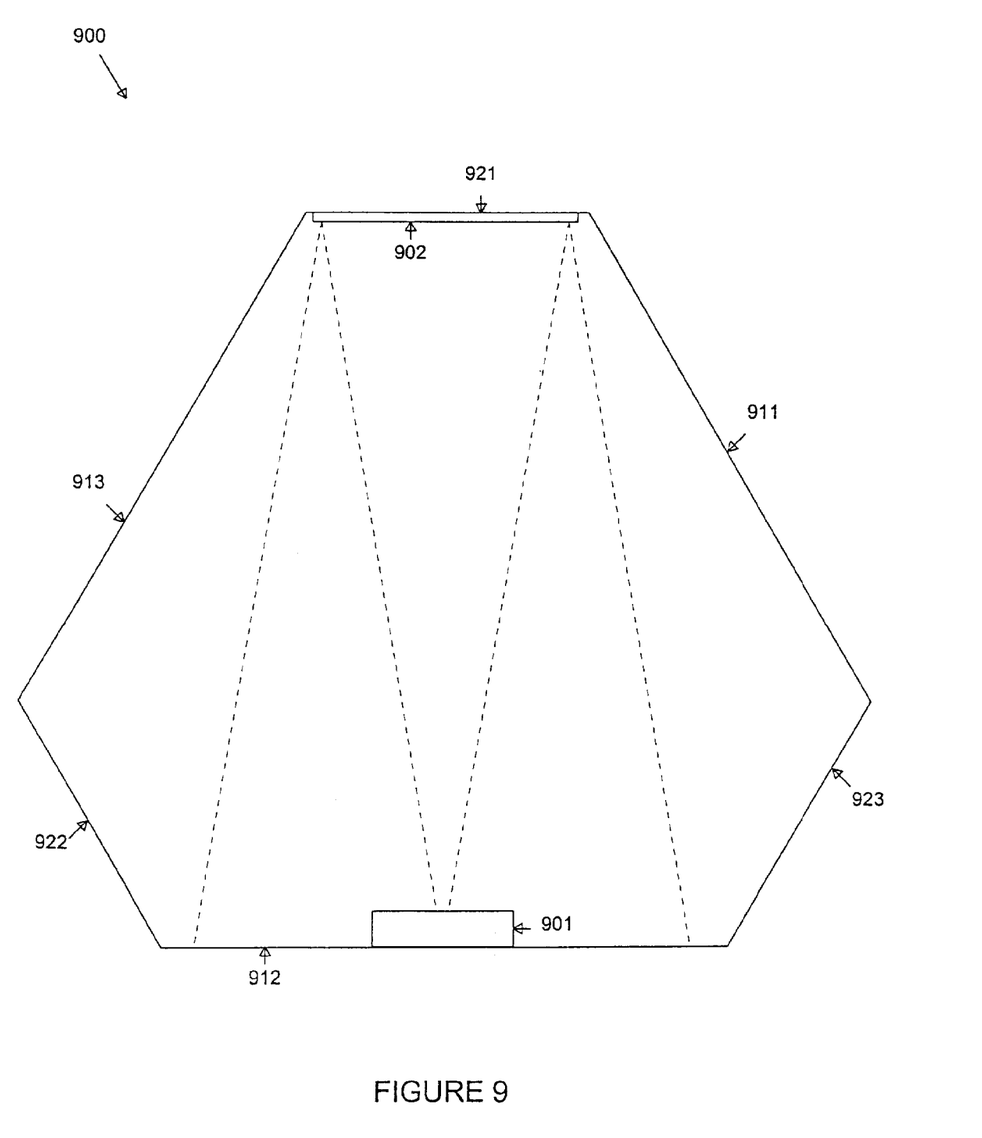
FIG. 9 is a top plan view of a multi-display system in accordance with another exemplary embodiment of the present invention.

FIG. 9 is a top plan view of a multi-display system 900 in accordance with another embodiment of the present invention. The multi-display system 900 comprises sidewalls 911, 912 and 913 on which images may be projected. The sidewalls 911–913 correspond to the sidewalls 111–113 in FIGS. 1 and 2. The multi-display system 900 also comprises the sidewalls 921, 922 and 923. The sidewalls 921–923 correspond to the sidewalls 203–205 in FIGS. 1 and 2.

The multi-display system 900 uses a mirror mounted on a first sidewall to reflect the image beam projected from an image projector mounted on a second sidewall back onto the second sidewall. An exemplary mirror 921 and image projector 901 is shown in FIG. 9. Image projector 901 is mounted proximate either the top edge or the bottom edge of the sidewall 912 and projects an image beam, shown as dotted lines, onto the mirror 902 mounted on the opposing sidewall 921. Depending on whether the image projector 901 is mounted proximate the top edge or the bottom edge of the sidewall 912, the mirror 902 is correspondingly tilted so that the image beam is reflected back onto the approximate center of the inner surface of the sidewall 912. Corrective optics may be used in the image projector 901 to compensate for any keystone effects.

The result of using the mirror 902 arrangement is that the multi-display system 900 required to produce an image of a height, H, and width, W, on its sidewall is proportionally smaller that the multi-display system 100 required to produce an H×W image on its sidewall. Thus, the width and height of the sidewalls 911–913 may be made much closer to the dimensions, H×W, of the images projected thereon.

Figure 10:
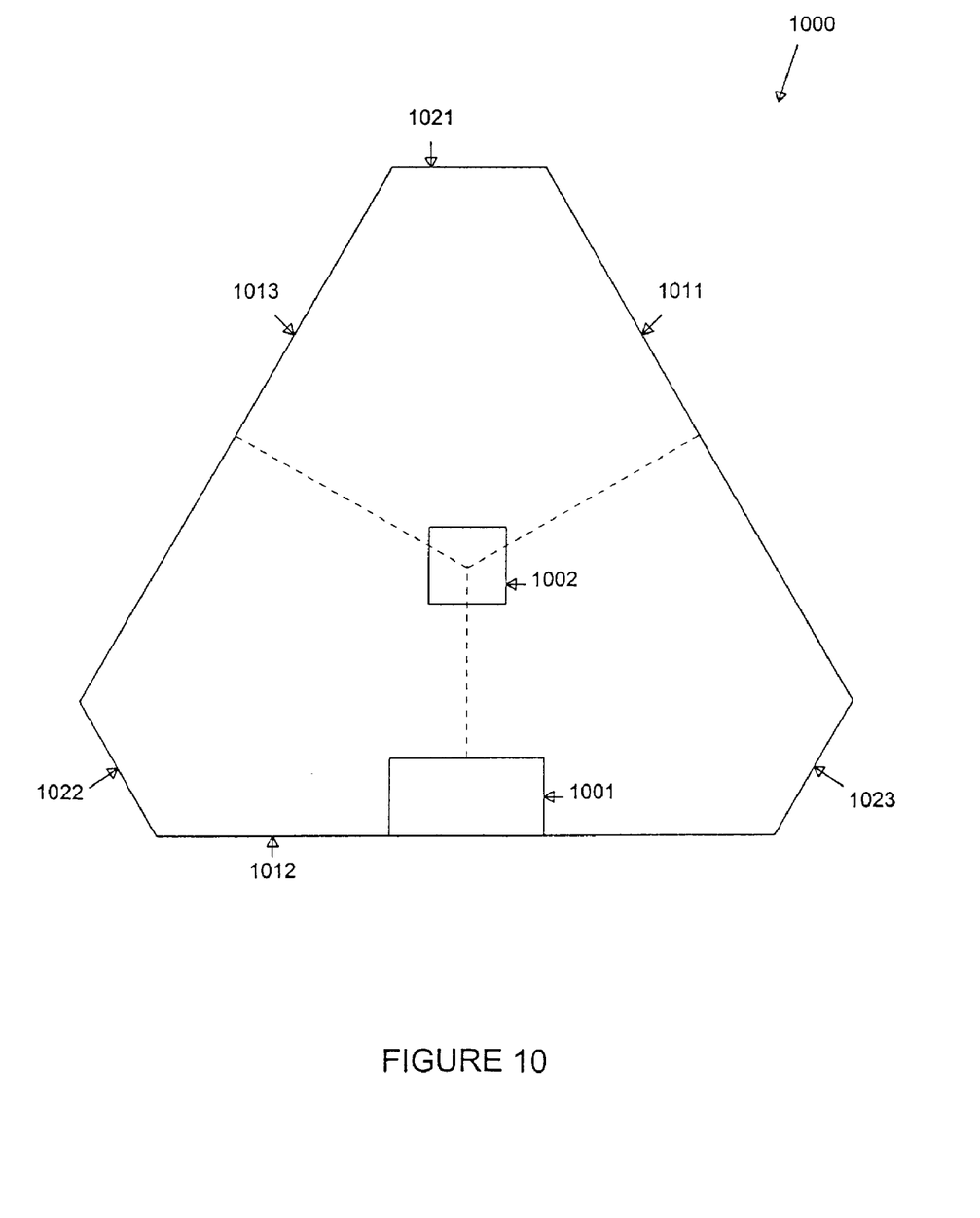
FIG. 10 is a top plan view of a multi-display system in accordance with yet another exemplary embodiment of the present invention.

FIG. 10 is a top plan view of a multi-display system 1000 in accordance with another embodiment of the present invention. The multi-display system 1000 comprises sidewalls 1011, 1012 and 1013 on which images may be projected. The sidewalls 1011–1013 correspond to the sidewalls 111–113 in FIGS. 1 and 2. The multi-display system 900 also comprises the sidewalls 1021, 1022 and 1023. The sidewalls 1021–1023 correspond to the sidewalls 203–205 in FIGS. 1 and 2.

The multi-display system 1000 uses a beam splitting device, such as a prism, mounted in the interior to reflect two or more image beams projected from an image projector onto the sidewalls of the multi-display system 1000. An exemplary beam splitting device 1002 and image projector 1001 are shown in FIG. 10. Image projector 1001 is mounted on the sidewall 1012 and projects a single image beam, shown as a dotted line, into the beam splitting device 1002. The beam splitting device 1002 emits two image beams, also shown as dotted lines, onto the sidewalls 1011 and 1013.

Using the beam splitting device 1002 allow a single image projector 1001 to produce video images on two or more inner surfaces of the sidewalls of the multi-display system 100. Since the multi-display system 1000 requires only one, rather than three image projectors, the weight, the complexity, and the cost of the multi-display system 1000 is thereby reduced.

Although the present invention and its advantages have been described in detail, those skilled in the art should understand that they can make various changes, substitutions and alterations herein without departing from the spirit and scope of the invention in its broadest form.

What is claimed is:

1. A multi-display system comprising:
   a structure having a substantially inflexible frame and a plurality of sides that cooperatively form an enclosure having a volume, at least two of said sides including light transmissive portions; and
   at least two image projectors, disposed within said structure, that are capable of projecting intersecting image beams through said volume of said enclosure onto said at least two of said sides to thereby produce viewable images on said light transmissive portions that are viewable by viewers outside said multi-display system, each one of said at least two image projectors disposed opposite an associated one of said light transmissive portions thereby minimizing said volume of said enclosure.

2. The multi-display system set forth in claim 1 wherein at least a portion of said projected image beams intersect without interference.

3. The multi-display system set forth in claim 1 wherein said structure is substantially a polygon and a first one of said image projectors is associated with a vertex of said polygon.

4. The multi-display system set forth in claim 3 wherein a first one of said sides is substantially opposite said vertex.

5. The multi-display system set forth in claim 1 wherein a first one of said image projectors is associated with a first one of said sides and a second one of said image projectors is associated with a second one of said sides.

6. The multi-display system set forth in claim 1 wherein said multi-display system further comprises means for associating said multi-display system with at least one of a ceiling, a deck and another multi-display system.

7. The multi-display system set forth in claim 1 wherein said plurality of sides at least substantially ensconce said enclosure.

8. The multi-display system set forth in claim 1 wherein at least one of said sides includes a substantially opaque portion.

9. The multi-display system set forth in claim 1 further comprising a controller that is capable of controlling at least one of said at least two image projectors and at least one of said projected image beams.

10. The multi-display system set forth in claim 1 further comprising a means for adjusting a relative distance between said multi-display system and a deck.

11. A multi-display system comprising:
    a structure having a substantially inflexible frame and a plurality of sides that cooperatively form an enclosure having a volume, at least two of said sides including light transmissive portions; and
    at least two image projectors, disposed within said structure, that are capable of projecting image beams through said volume of said enclosure that produce viewable images through said light transmissive portions that are viewable by viewers outside said multi-display system, at least a portion of said projected image beams intersecting without interfering with said produced viewable images, each one of said at least two image projectors disposed opposite an associated one of said light transmissive portions thereby minimizing said volume of said enclosure.

12. The multi-display system set forth in claim 11 wherein said structure is substantially a polygon and a first one of said image projectors is associated with a vertex of said polygon.

13. The multi-display system set forth in claim 12 wherein said first one of said sides is substantially opposite said vertex.

14. The multi-display system set forth in claim 11 wherein a first one of said image projectors is associated with a first one of said sides and a second one of said image projectors is associated with a second one of said sides.

15. The multi-display system set forth in claim 11 wherein said multi-display system further comprises means for associating said multi-display system with at least one of a ceiling, a deck and another multi-display system.

16. The multi-display system set forth in claim 11 wherein said plurality of sides at least substantially ensconce said enclosure.

17. The multi-display system set forth in claim 11 wherein at least one of said sides includes a substantially opaque portion.

18. The multi-display system set forth in claim 11 further comprising a controller that is capable of controlling at least one of said at least two image projectors and at least one of said projected image beams.

19. The multi-display system set forth in claim 11 further comprising a means for adjusting a relative distance between said multi-display system and a deck.

20. A multi-display system comprising:

a structure having a substantially inflexible frame and a plurality of sides that cooperatively form an enclosure having a volume, at least two of said sides including light transmissive portions;

image generating means, disposed within said structure, for generating image beams that produce viewable images through said volume of said enclosure through said light transmissive portions that are viewable by viewers outside said multi-display system, said image generating means disposed opposite an associated one of said light transmissive portions thereby minimizing said volume of said enclosure;

a means for associating said multi-display system with at least one of a ceiling, a deck and another multi-display system; and a controller that is capable of controlling said image generating means and at least one of said generated image beams.

\* \* \* \* \*